United States Patent
Lafreniere et al.

(10) Patent No.: US 10,343,732 B2
(45) Date of Patent: Jul. 9, 2019

(54) STEERING ASSEMBLY FOR SUPPORTING A TRACK SYSTEM ON A VEHICLE

(71) Applicant: SOUCY INTERNATIONAL INC., Drummondville (CA)

(72) Inventors: Pascal Lafreniere, St-Cyrille-de-Wendover (CA); William Gasse, Drummondville (CA); Francois Belanger, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 128 days.

(21) Appl. No.: 15/716,885

(22) Filed: Sep. 27, 2017

(65) Prior Publication Data

US 2018/0079458 A1  Mar. 22, 2018

Related U.S. Application Data

(62) Division of application No. 14/024,952, filed on Sep. 12, 2013, now Pat. No. 10,005,505.

(60) Provisional application No. 61/700,000, filed on Sep. 12, 2012.

(51) Int. Cl.
| | | |
|---|---|---|
| *B62D 55/04* | (2006.01) | |
| *B62D 55/065* | (2006.01) | |
| *B62D 55/084* | (2006.01) | |

(52) U.S. Cl.
CPC ........... *B62D 55/084* (2013.01); *B62D 55/04* (2013.01); *B62D 55/065* (2013.01); *Y10T 403/70* (2015.01)

(58) Field of Classification Search
CPC .... B62D 49/0635; B62D 55/02; B62D 55/04; B62D 55/065; B62D 55/084

USPC ...................................... 180/9.21, 9.44, 9.46
See application file for complete search history.

(56) References Cited

U.S. PATENT DOCUMENTS

| | | | |
|---|---|---|---|
| 6,176,334 B1 | 1/2001 | Lorenzen | |
| 8,245,800 B2 | 8/2012 | Hansen | |
| 8,430,188 B2 | 4/2013 | Hansen | |
| 10,005,505 B2 * | 6/2018 | Lafreniere | B62D 55/084 |
| 2010/0012399 A1 | 1/2010 | Hansen | |
| 2010/0139994 A1 | 6/2010 | Hansen | |
| 2015/0197279 A1 * | 7/2015 | Pare | B62D 7/18 |
| | | | 280/93.512 |

FOREIGN PATENT DOCUMENTS

WO       2011000093 A1    1/2011

OTHER PUBLICATIONS

European Search report from EP 13184022, dated Aug. 18, 2014, Burley, James.

* cited by examiner

*Primary Examiner* — Anne Marie M Boehler
(74) *Attorney, Agent, or Firm* — BCF LLP

(57) ABSTRACT

A steering assembly for supporting a track system on a vehicle includes a steering knuckle, a first member being secured to a top side of the steering knuckle, a second member being secured to a bottom side of the steering knuckle, and a support frame. The support frame has a top portion being secured to the first member, a bottom portion being secured to the second member and being configured to be secured to the track system to support the track system on the vehicle, and a central portion extending between the top portion and the bottom portion of the support frame and being positioned solely on one of the front side and the rear side of the steering knuckle when the steering assembly is in use.

12 Claims, 13 Drawing Sheets

STEERING ASSEMBLY FOR SUPPORTING A TRACK SYSTEM ON A VEHICLE

CROSS-REFERENCE TO RELATED APPLICATIONS

The present patent application is a divisional of U.S. patent application Ser. No. 14/024,952, filed Sep. 12, 2013, entitled "Semi-Generic Steering Knuckle Adapter Assembly for a Vehicle". Through the '952 application, the present application claims priority to U.S. Provisional Patent Application No. 61/700,000, filed Sep. 12, 2012, entitled "Semi-Generic Steering Knuckle Adapter Assembly for a Vehicle". Both of those applications are incorporated herein by reference in their entirety.

FIELD OF THE INVENTION

The present invention generally relates to track systems and traction assemblies used as wheel replacement for typically wheeled vehicles. More particularly, the present invention relates to structural assemblies used to mount track systems and traction assemblies on normally wheeled vehicles, and more particularly on heavy normally wheeled vehicles such as, but not limited to, farming and agricultural vehicles (e.g. tractors, harvesters, etc.), construction and industrial vehicles (e.g. excavators, loaders, combines, forestry equipments), and military vehicles.

BACKGROUND OF THE INVENTION

Soil compaction and floatation have always been important issues for farmers operating tractors and other farming vehicles in their fields. It has thus been found advantageous to replace two or even all four wheels of farming tractors (and other wheeled vehicles) with track systems which use endless traction bands instead of wheels for propulsion.

Using track systems instead of wheels brings several advantages when operated on soft terrains. For instance, the larger surface area of the traction bands improves the floatation and also generally improves the overall traction of the tractor.

However, tractors, and other similar normally wheeled vehicles, are still typically sold with wheels and are typically configured to be operated with wheels. Hence, tractors are typically not configured to receive or support track systems. Thus, when an operator wants to replace the wheels of its tractor with track systems, the installation may involve the attachment of the track systems to the vehicle at locations which, in some case, were not initially designed to support and/or sustain the additional load imparted by the track systems during use.

This is true of track systems installed as replacement of steerable wheels, typically the front wheels, since the track systems need to remain steerable. Hence, the replacement of steerable wheels by track systems may involve the attachment of the track systems to or near the steering knuckles (e.g. to the wheel hubs, to the bolts holding the kingpin, etc.).

However, as the steering knuckles of a tractor are generally not made nor configured to support track systems, these installations may be difficult, can cause premature wearing of steering components of the tractor, and/or can even cause premature failure of those components. These installations can also cause premature wearing of components of the track systems (i.e. the traction band, road wheels, idler wheels, etc.) due, for instance, to misalignment between the track systems and the vehicle.

Hence, despite the advantages of using track systems on farming tractors and other similar vehicles, there are still some shortcomings that need to be addressed.

SUMMARY OF THE INVENTION

At least some of the shortcomings of the prior art steering knuckles and steering assemblies regarding the installation of track systems are generally mitigated by a semi-generic steering knuckle adapter assembly which generally acts as an interface between the track system and the steering knuckle to which the track system is mounted.

Hence, in accordance with the principles of the present invention, the semi-generic steering knuckle adapter assembly generally comprises at least one customized adapting member (also sometimes referred to as an adapter frame or an adapter plate) configured to be mounted to the steering knuckle, and a generic supporting member (also referred to as a support frame or a support plate) configured to be mounted to the at least one customized adapting member and which is provided with preconfigured attachment locations where the track system can be mounted and properly secured.

Understandably, the at least one adapting member comprises at least one customized portion configured to be mounted to a particular steering knuckle or type of steering knuckles, and a generic portion configured to mate with the generic supporting member.

The supporting member, which is configured to be mounted to the at least one adapting member, comprises a portion which is provided with the preconfigured attachment locations. The attachment locations are typically disposed such as to allow a variety of track systems to be mounted to the adapter assembly with limited or no modifications. Hence, the attachment locations allow the track system to be mounted at proper locations on the steering assembly of the vehicle. In addition, the portion of the supporting member provided with the attachment locations is typically reinforced or made bigger in order to properly support and sustain the forces transmitted by the track system to the adapter assembly during operation of the vehicle.

In typical though non-limitative embodiments, the at least one customized adapting member is configured to be fastened to the steering knuckle with threaded fasteners (e.g. bolts).

In typical though non-limitative embodiments, the adapter assembly comprises two customized adapting members, one typically customized to be mounted to the top portion of the steering knuckle, and one typically customized to be mounted to the bottom portion of the steering knuckle. In such embodiments, the supporting member is configured to be mounted to both adapting members.

In typical though non-limitative embodiments, the attachment locations are located in the bottom portion of the supporting member. In such embodiments, the under surface of the bottom portion of the supporting member typically comprises a substantially flat receiving area configured to mate with a support frame of the track system.

In typical though non-limitative embodiments, the attachment locations are threaded holes configured to receive correspondingly threaded fasteners (e.g. bolts).

By providing an interfacing assembly between the track system and the steering knuckle, the semi-generic steering knuckle adapter assembly in accordance with the principles of the present invention provides proper locations where the track system can be secured to the steering knuckle while avoiding attachment at inconvenient or weak locations.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION

A novel semi-generic steering knuckle adapter assembly will be described hereinafter. Although the invention is described in terms of specific illustrative embodiments, it is to be understood that the embodiments described herein are by way of example only and that the scope of the invention is not intended to be limited thereby.

Figure 1:
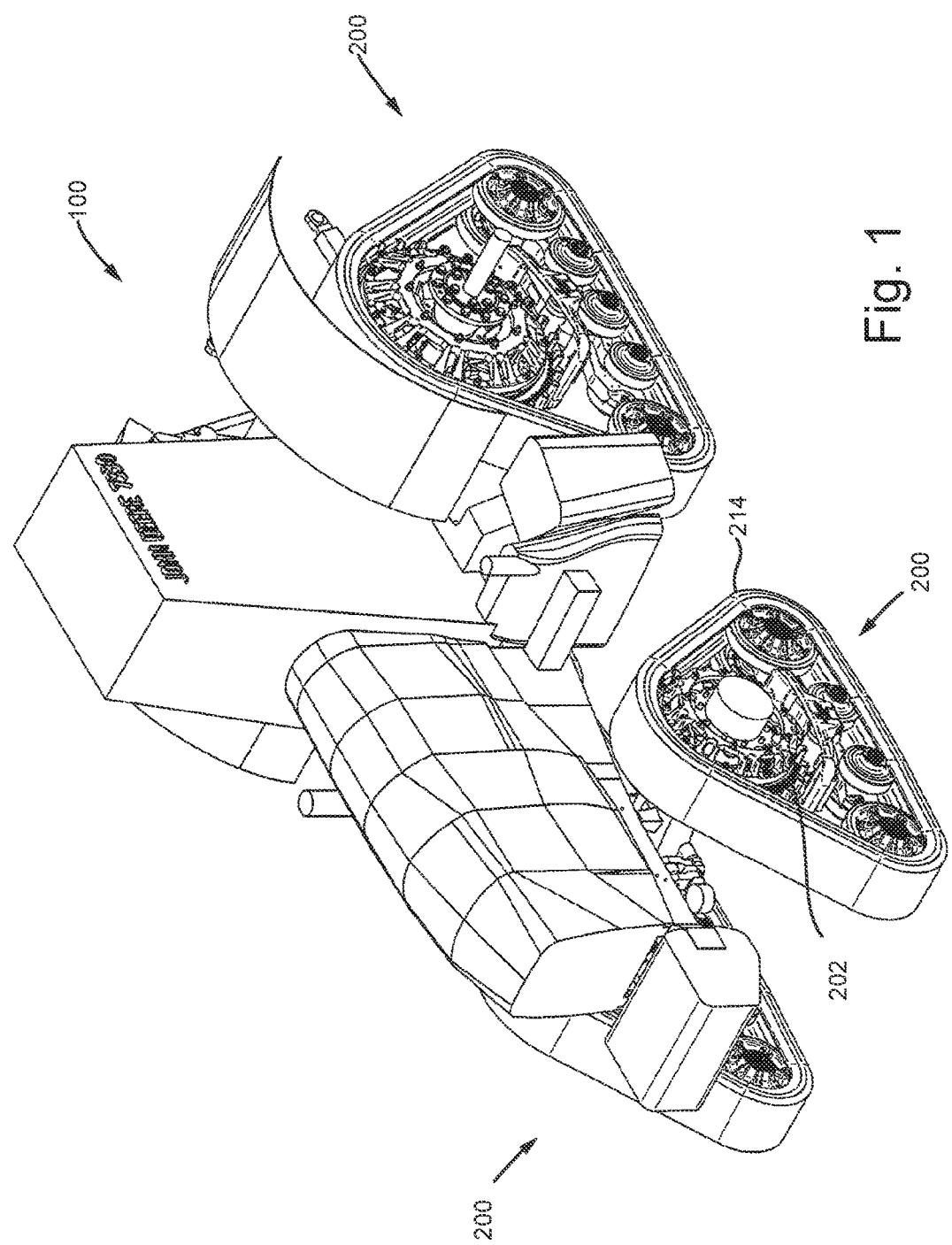
FIG. 1 is a perspective view of a farming vehicle equipped with two front track systems and two rear track systems.
Figure 2:
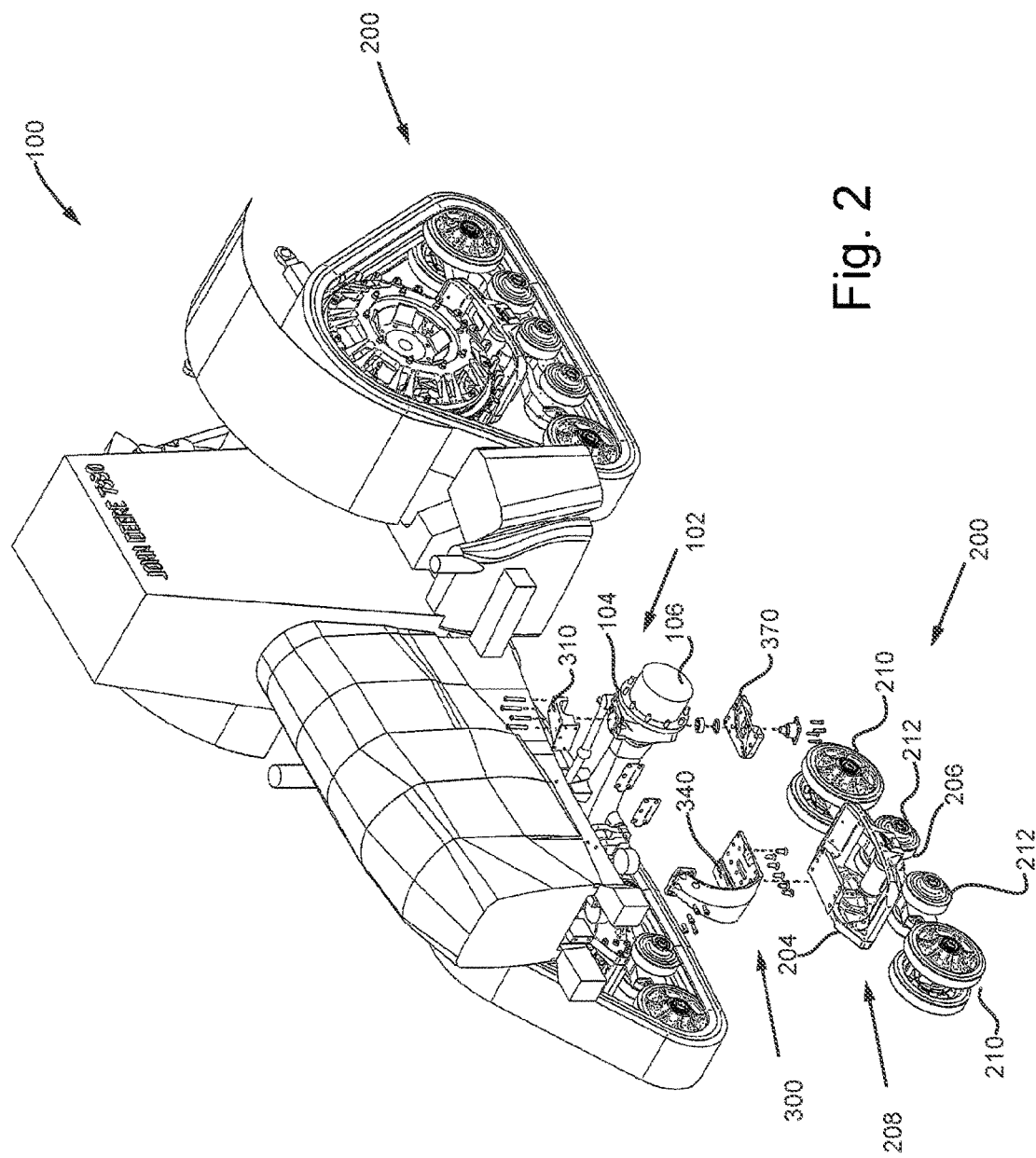
FIG. 2 is a perspective view of the farming vehicle of FIG. 1 in which the front left track system is partially exploded.
Figure 3:
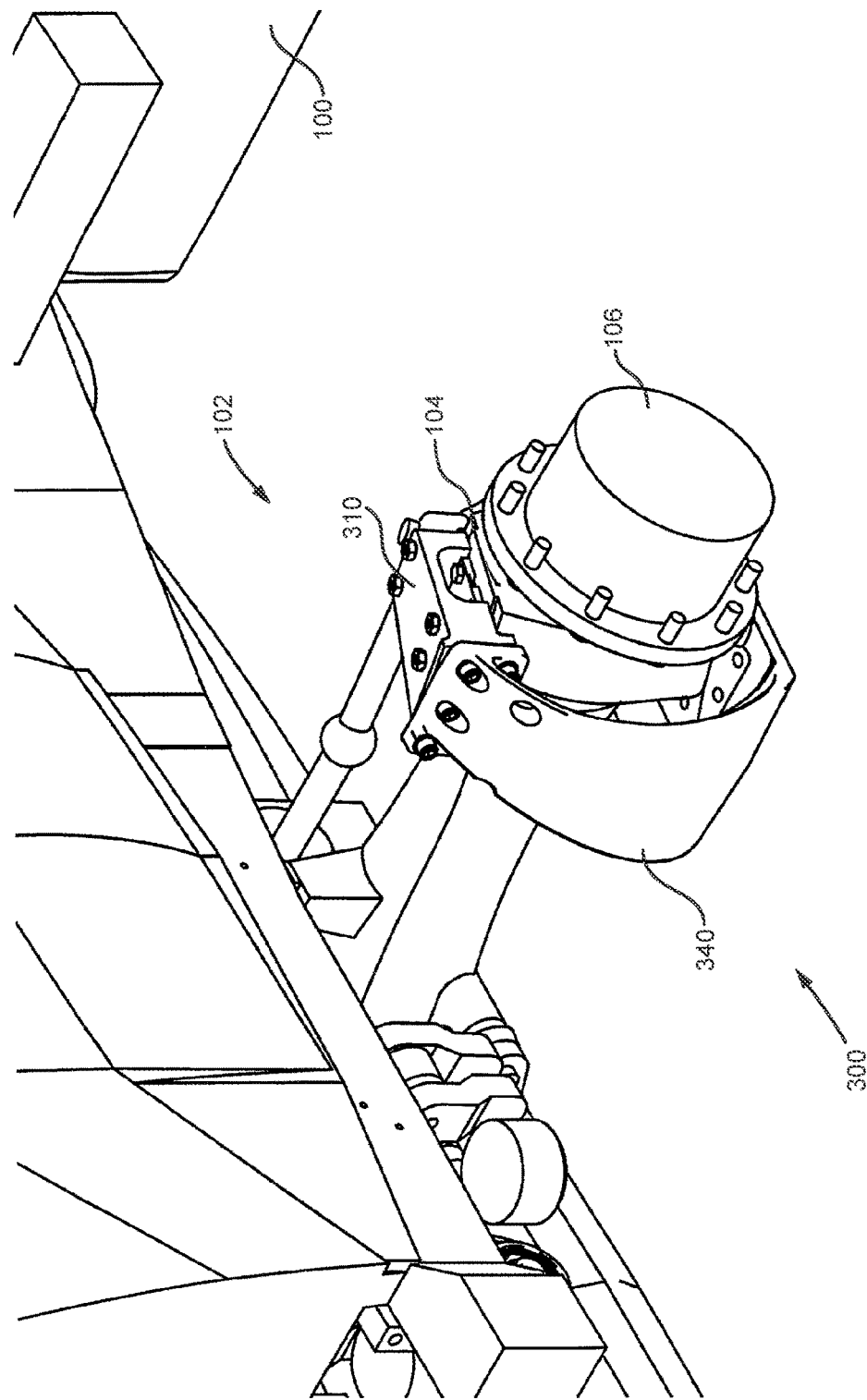
FIG. 3 is a front perspective view of the front left steering knuckle of the farming vehicle of FIG. 1 having mounted thereto a semi-generic steering knuckle adapter assembly in accordance with the principles of the present invention.
Figure 4:
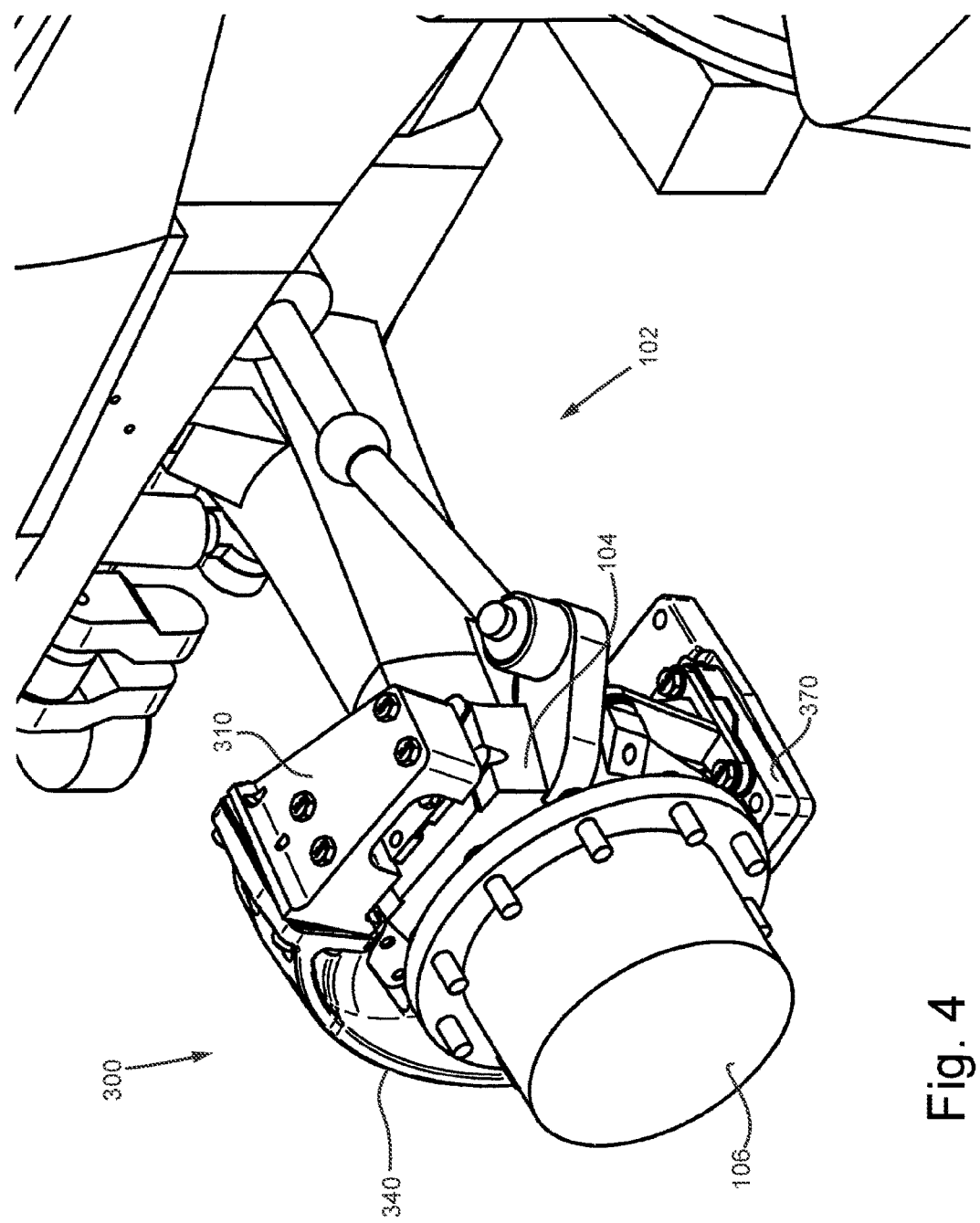
FIG. 4 is a rear perspective view of the front left steering knuckle and semi-generic steering knuckle adapter assembly of FIG. 3.
Figure 5:
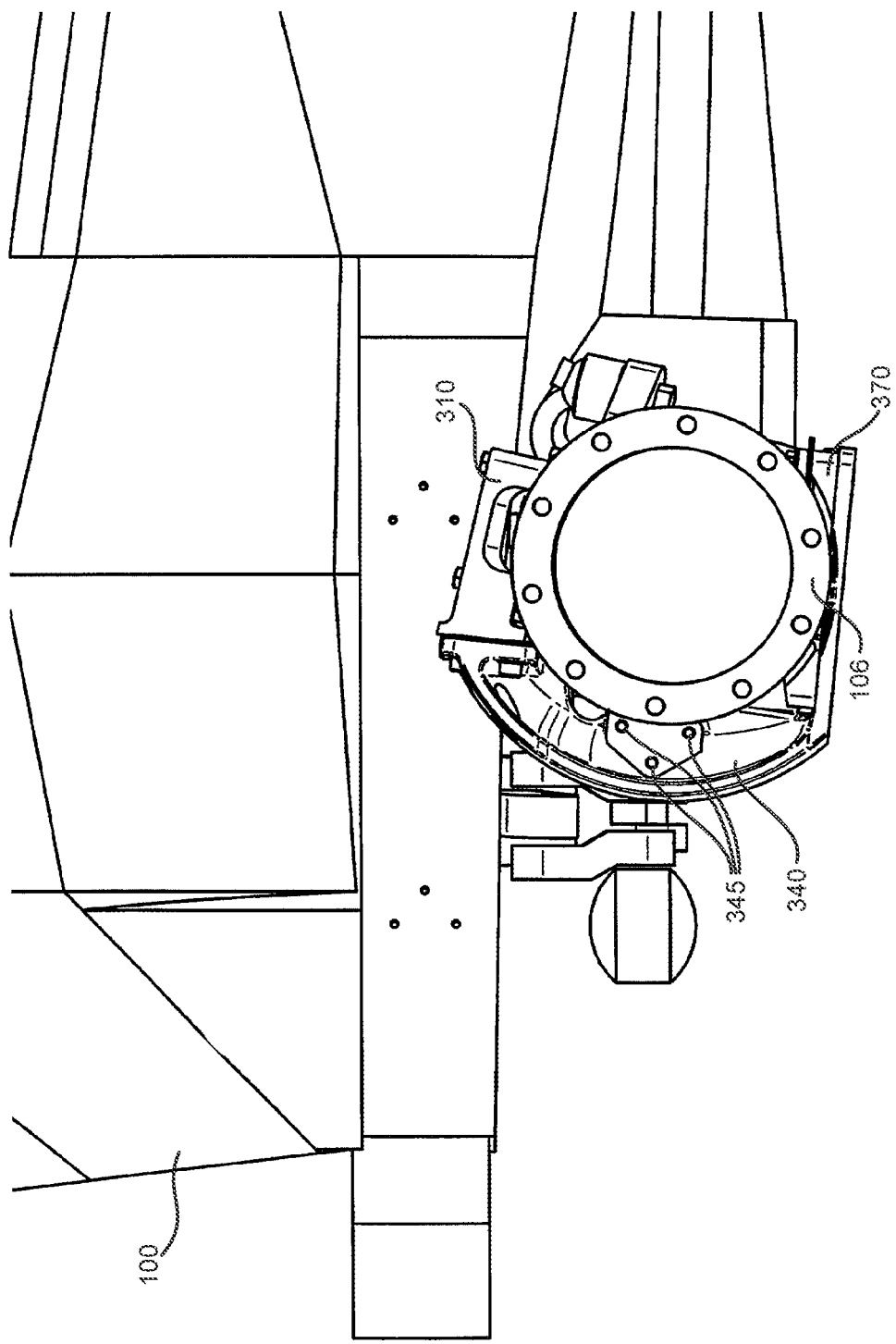
FIG. 5 is a side view of the front left steering knuckle and semi-generic steering knuckle adapter assembly of FIG. 3.
Figure 6:
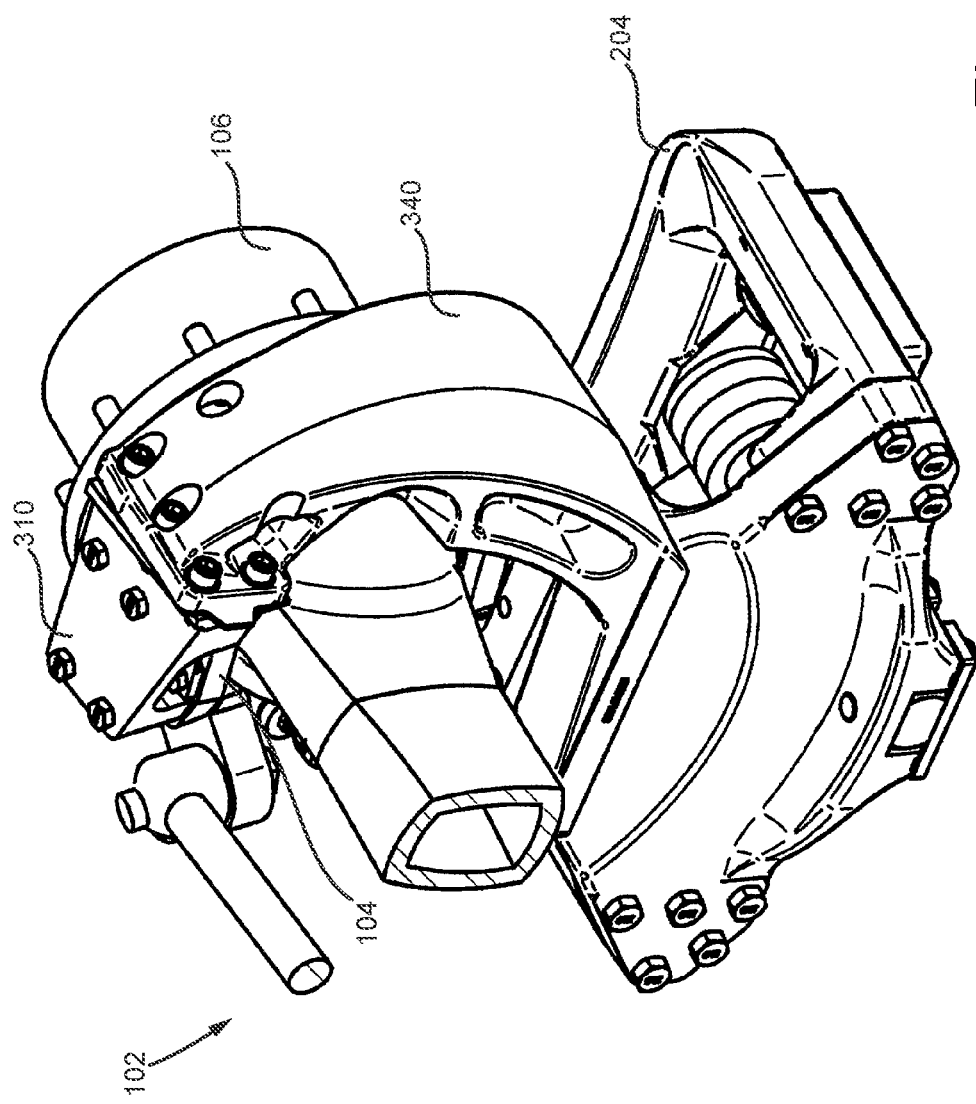
FIG. 6 is a fragmentary front interior perspective view of the front left steering knuckle and semi-generic steering knuckle adapter assembly of FIG. 3, with the support frame of the track system mounted to the adapter assembly.
Figure 7:
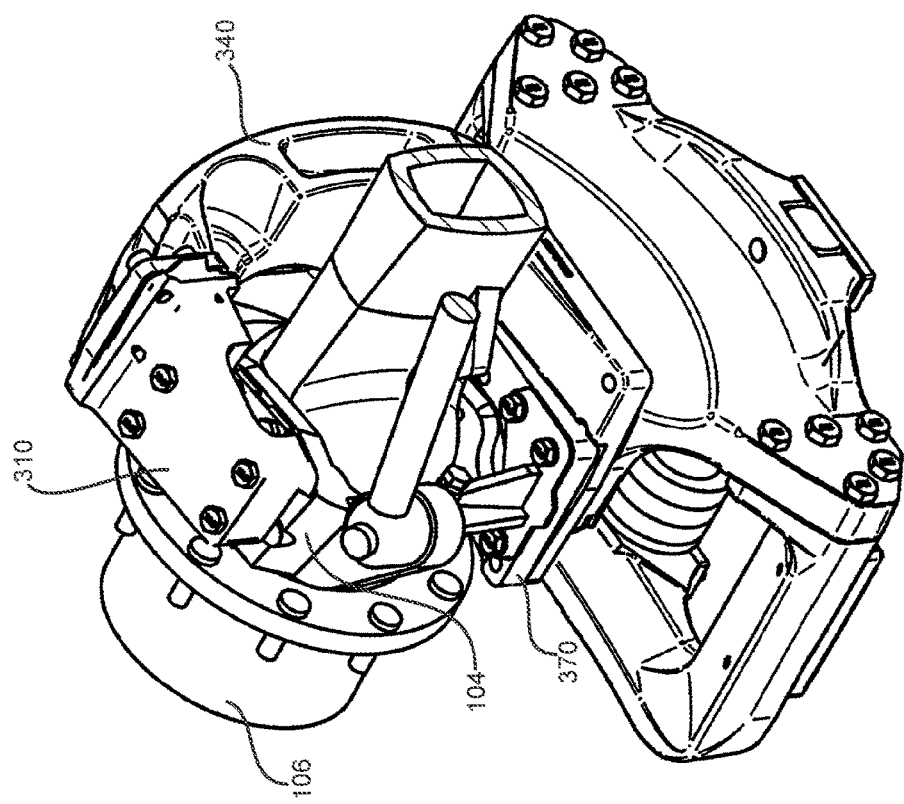
FIG. 7 is a fragmentary rear interior perspective view of the front left steering knuckle and semi-generic steering knuckle adapter assembly with the support frame of the track system mounted thereto of FIG. 6.
Figure 8:
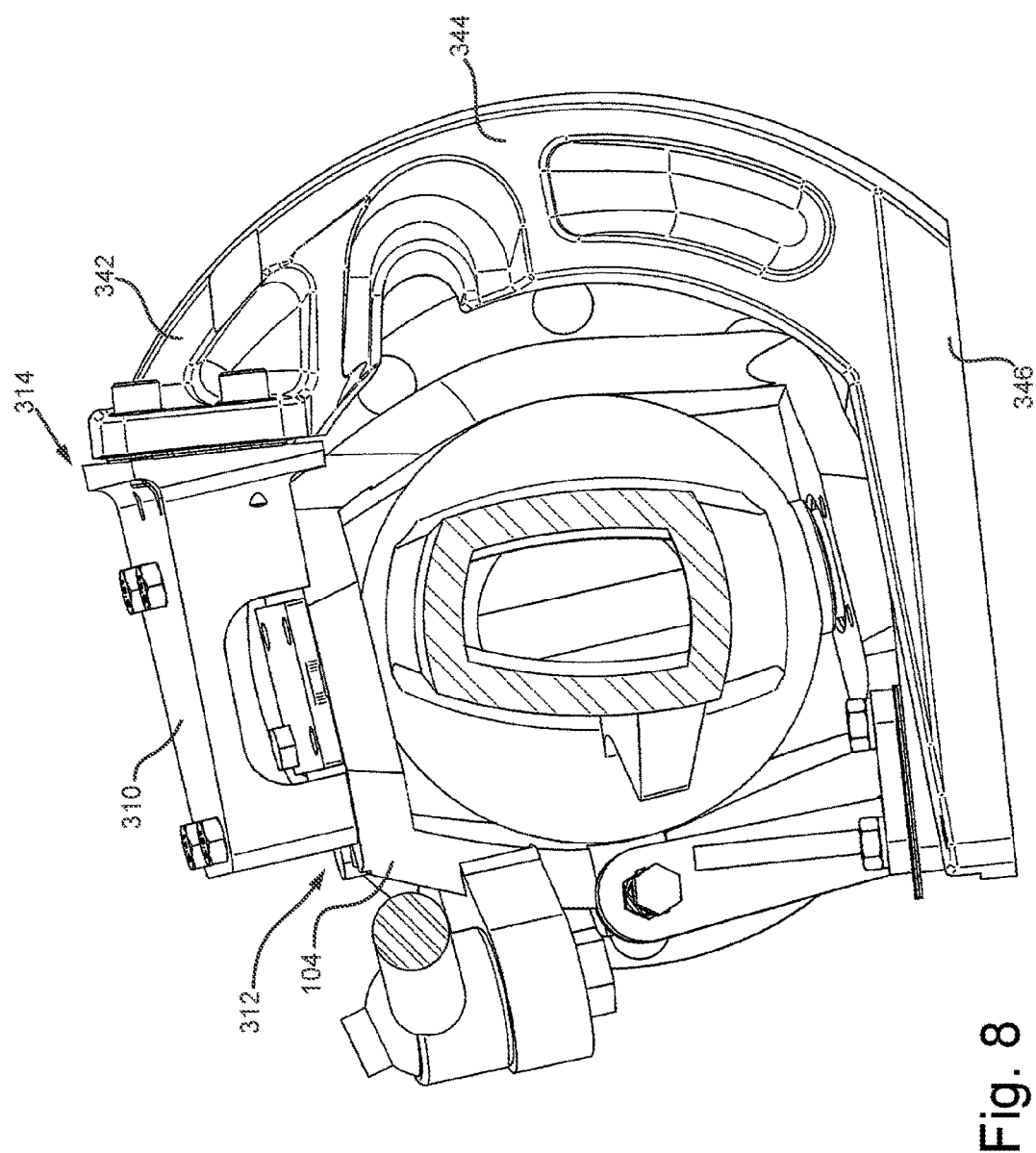
FIG. 8 is a fragmentary interior side view of the front left steering knuckle and semi-generic steering knuckle adapter assembly of FIG. 3.
Figure 9:
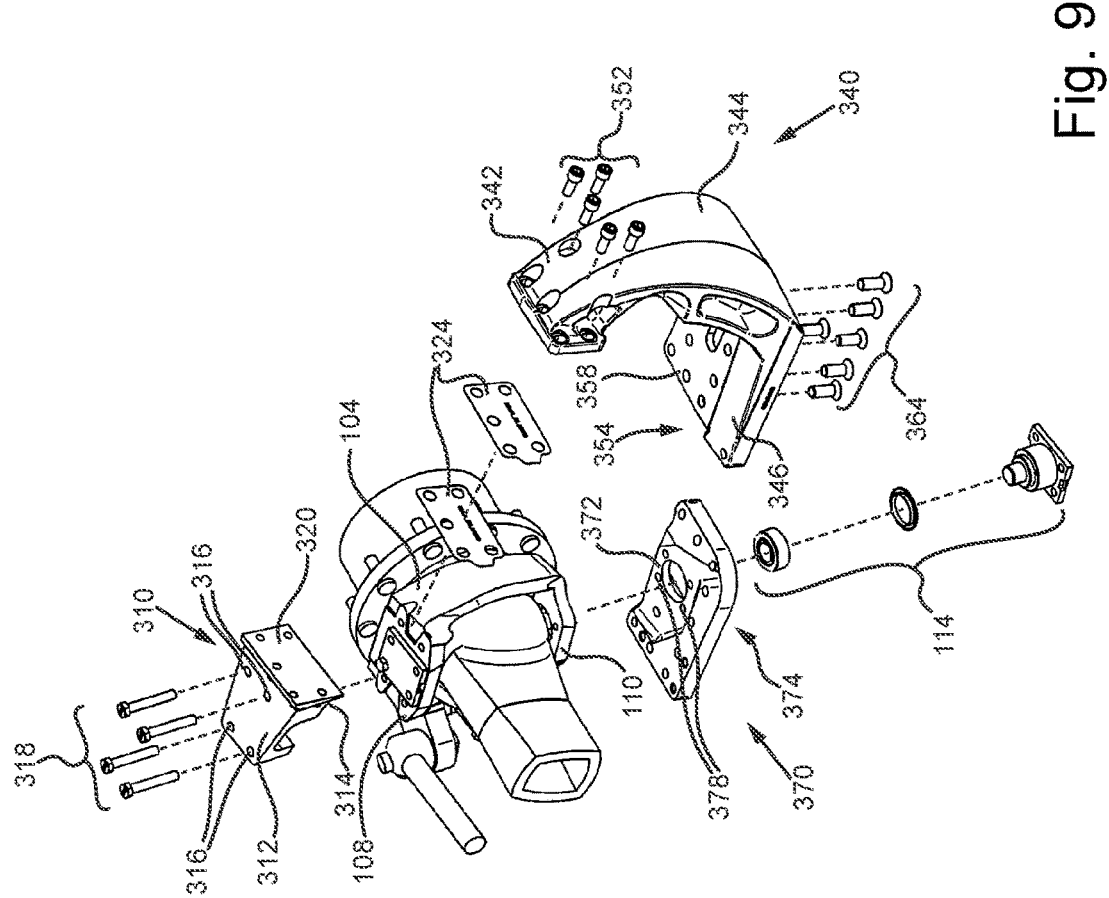
FIG. 9 is a fragmentary front interior exploded perspective view of the front left steering knuckle and semi-generic steering knuckle adapter assembly of FIG. 3.
Figure 10:
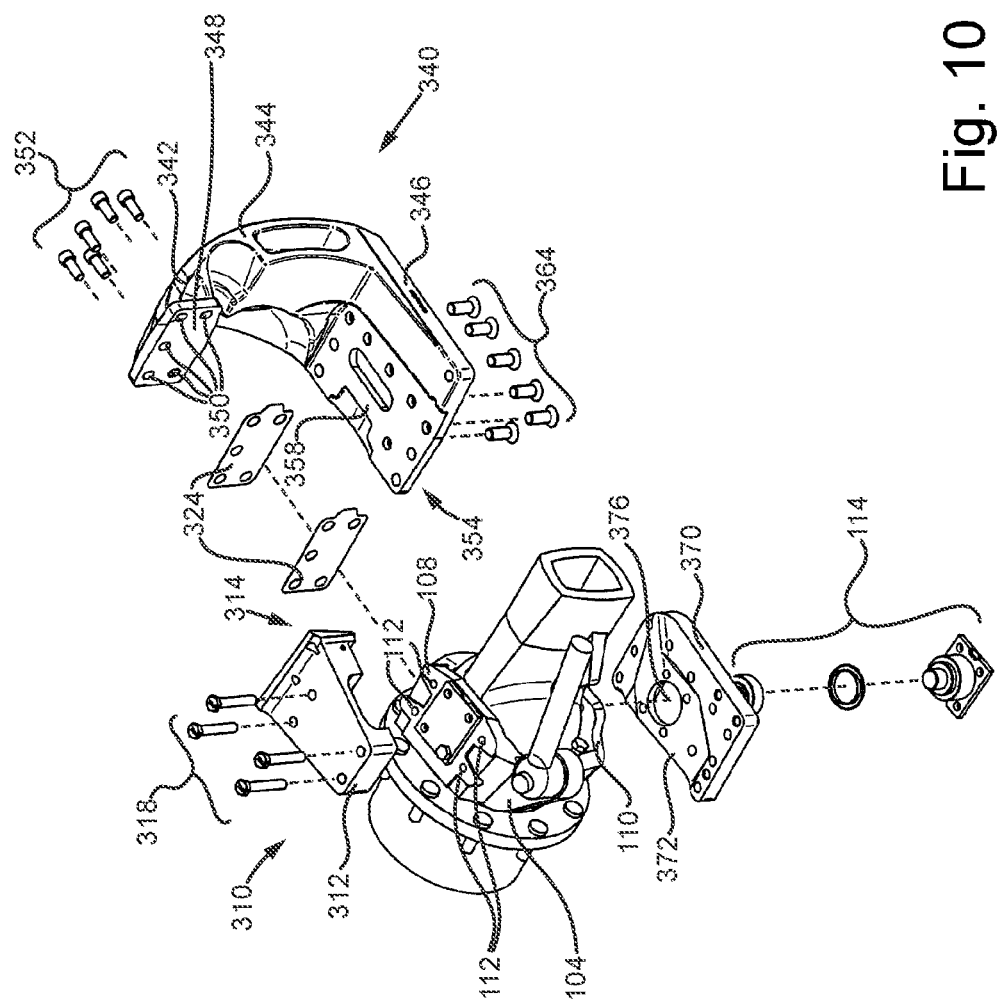
FIG. 10 is a fragmentary rear interior exploded perspective view of the front left steering knuckle and semi-generic steering knuckle adapter assembly of FIG. 3.
Figure 11:
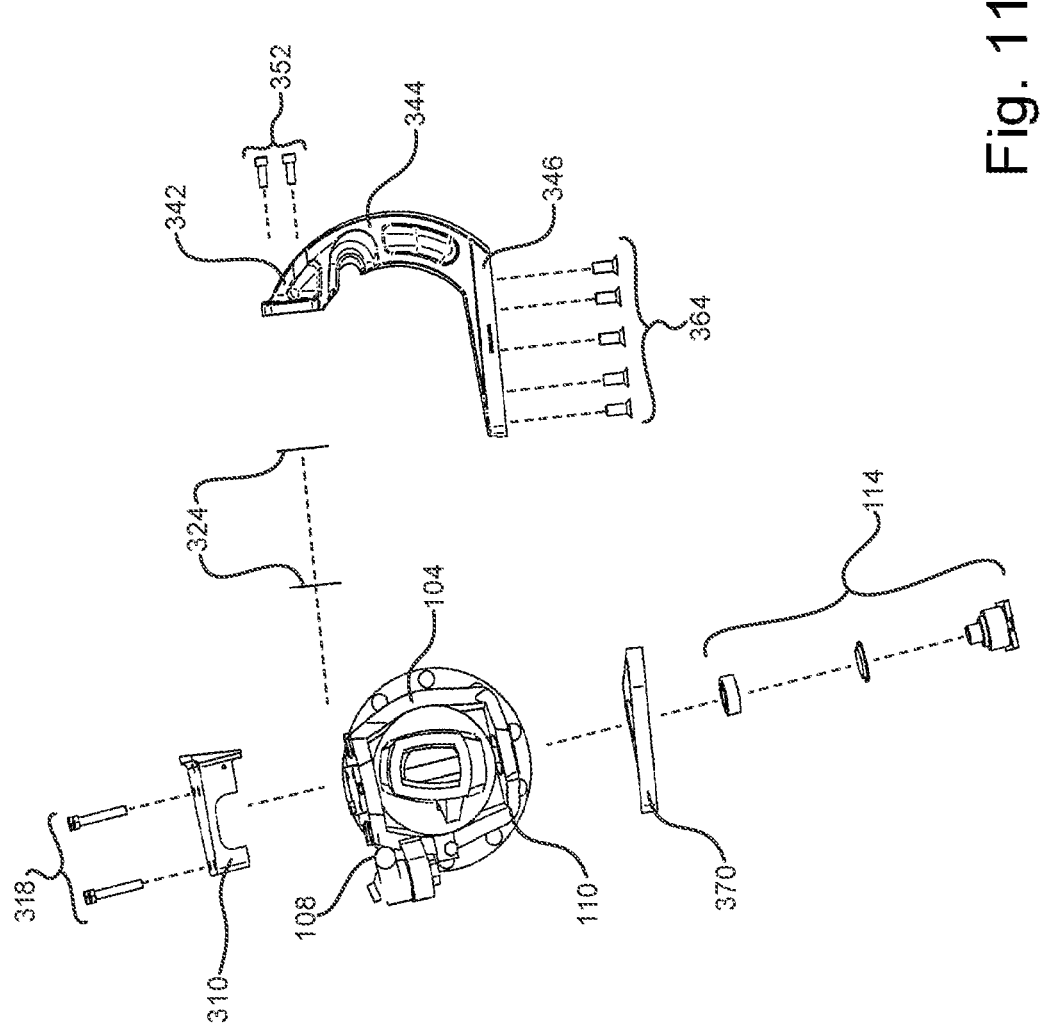
FIG. 11 is a fragmentary interior exploded side view of the front left steering knuckle and semi-generic steering knuckle adapter assembly of FIG. 3.
Figure 12:
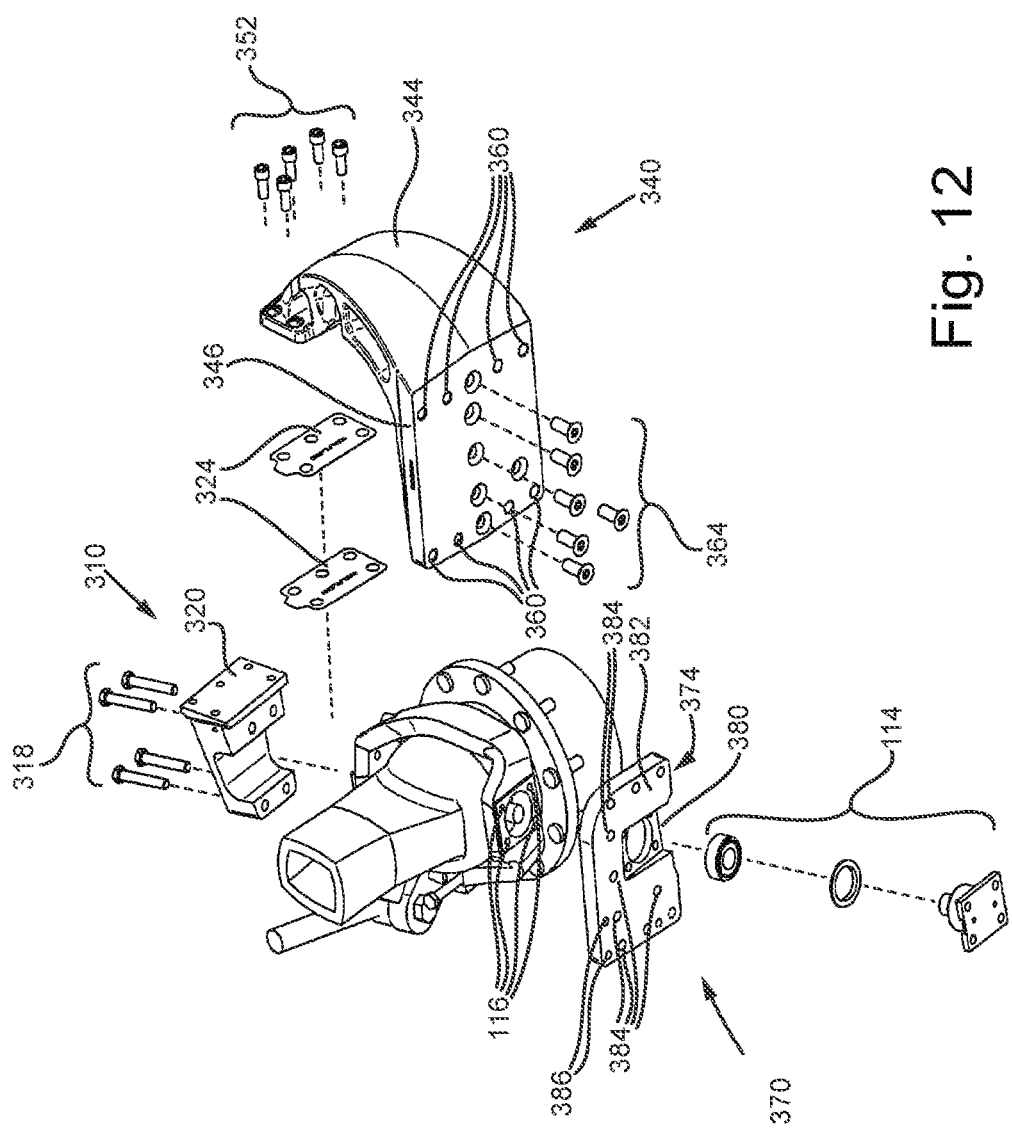
FIG. 12 is a fragmentary front interior exploded perspective view of the front left steering knuckle and semi-generic steering knuckle adapter assembly of FIG. 3.
Figure 13:
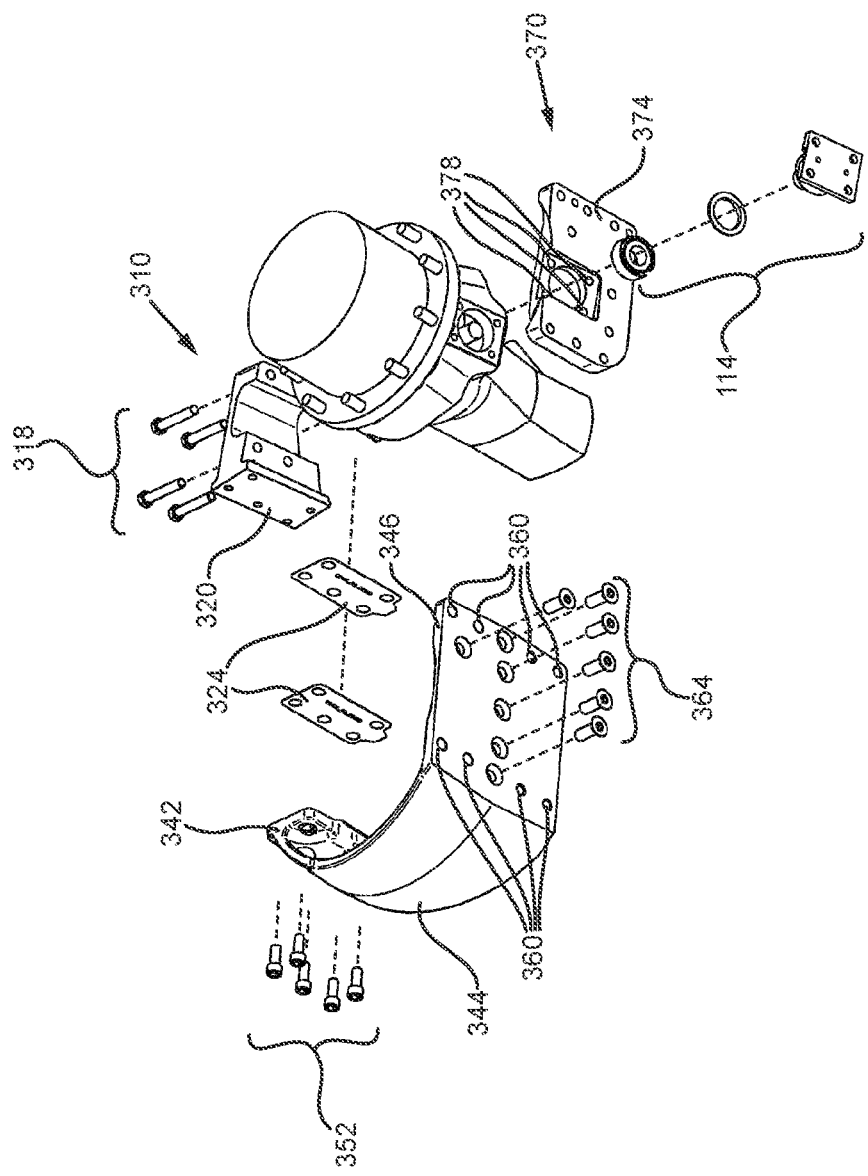
FIG. 13 is a fragmentary front exterior exploded perspective view of the front left steering knuckle and semi-generic steering knuckle adapter assembly of FIG. 3.

Referring first to FIGS. 1 and 2, a farming tractor 100 equipped with four wheel-replacing track systems 200 is illustrated. In the present embodiment, the two front track systems 200 respectively replace the steerable front wheels (not shown) of the tractor 100 while the two rear track systems 200 respectively replace the non-steerable rear wheels (not shown) of the tractor 100.

In the present embodiment, in order to respect the geometry of the wheels they replace, the front track systems 200 are smaller than the rear track systems 200. Still, in other embodiments, the front and rear track systems 200 could be of the same size.

Referring more particularly to FIG. 2, the front track systems 200 are respectively secured to the left and right steering assemblies 102 and more particularly to the steering knuckles 104 and hubs 106 thereof.

As the left and right steering assemblies 102, the left and right front track systems 200, and the left and right adapter assemblies 300 are mirror image of each other, the following description will only refer to the left steering assembly 102, to the left front track system 200, and to the left adapter assembly 300. It remains that the description applies equally to both steering assembly 102, to both front track systems 200, and to both adapter assemblies 300.

Still referring to FIG. 2, the front left track system 200 (hereafter "the track system") is shown mounted to the steering knuckle 104 via an embodiment of the semi-generic steering knuckle adapter assembly 300 in accordance with the principles of the present invention.

In the present embodiment, the track system 200 generally comprises a drive wheel 202 (e.g. a sprocket wheel) configured to the mounted to the hub 106 of the vehicle 100, an upper support frame 204 configured to be mounted to the vehicle 100, and more particularly to the adapter assembly 300, and a lower support frame 206 pivotally mounted to the upper support frame 204 (the upper and lower support frames 204 and 206 being collectively referred to as the support frame assembly 208). The lower support frame 206 supports idler wheels 210 pivotally mounted at the front and rear extremities thereof, and road wheels 212 pivotally mounted along the length thereof (the idler wheels 210 and the road wheels 212 being collectively referred to as the ground support wheels). An endless traction band 214 (see FIG. 1) is disposed around the various wheels 202, 210 and 212 and is configured to be entrained by the drive wheel 202 for propelling the vehicle 100.

In the present embodiment, the traction band 214 is made from reinforced elastomeric material.

As it will be best understood below, the adapter assembly 300 is configured to be mounted to the steering knuckle 104 of the vehicle 100 in order to provide predetermined attachment locations 360 where the track system 200 can be properly secured.

In the present embodiment, the adapter assembly 300 generally comprises a first or top customized adapting member or plate 310 (hereafter "top member"), a second or bottom customized adapting member or plate 370 (hereafter "bottom member"), and a generic supporting member or frame 340 (hereafter "supporting member"). In the present embodiment, all three members 310, 340 and 370 are made of metallic material.

As it will be best understood below, the top and bottom members 310 and 370 are configured to be directly mounted to the steering knuckle 104 while the supporting member 340 is configured to be mounted to the top and bottom members 310 and 370.

Referring now to FIGS. 3 to 13, the present embodiment of the adapter assembly 300 will be described in more details.

The top member 310 is configured to be secured to the top portion 108 of the steering knuckle 104 and to the supporting member 340. In that sense, the top member 310 comprises a custom portion 312 particularly configured to be secured to the top portion 108 of the particular knuckle 104, and a generic portion 314 configured to be secured to the supporting member 340.

Understandably, the actual shape and configuration of the custom portion 312 of the top member 310 will vary in accordance with the actual shape and configuration of the top portion 108 of the knuckle 104. However, the configuration of the generic portion 314 will remain generally the same independently of the shape of the top portion 108 of the knuckle 104 in order to properly mate with the generic supporting member 340.

Referring more particularly to FIGS. 9 to 13, in the present embodiment, the custom portion 312 of the top member 310 comprises a set of fastener holes 316 which matches the set of mounting holes 112 present in the top portion 108 of the knuckle 104.

The fastener holes 316 allow the mounting fasteners 318 (e.g. bolts) to extend into the mounting holes 112.

In the present embodiment, the mounting holes 112 are threaded and the fasteners 318 have matching threads. In other embodiments, the top member 310 could be secured to the top portion 108 via other fastening arrangements.

The generic portion 314 of the top member 310 comprises a mating area 320 configured to mate with the corresponding mating area 348 on the top portion 342 of the supporting member 340. In the present embodiment, mating areas 320 and 348 are substantially flat. In other embodiments, mating areas 320 and 348 could be other than flat. However, in such cases, mating areas 320 and 348 would typically be complementary.

The mating area 320 comprises a series of mounting holes 322 for receiving mounting fasteners 352. In the present embodiment, the mounting holes 322 are threaded and the mounting fasteners 352 are correspondingly threaded (e.g. bolts). Still, in other embodiments, the supporting member 340 could be secured to the top member 310 using other forms of fastening arrangements.

As can be seen in FIGS. 9 to 13, one or more shim plates 324 can be placed between the mating areas 320 and 348 in order to provide slight adjustments between the top member 310 and the supporting member 340.

In the present embodiment, the shim plates 324 are made of metallic material, e.g. stainless steel, though in other embodiments, other appropriate material(s) could be used (e.g. polymeric materials, elastomeric materials, composite materials, etc.).

Referring back to FIGS. 3 to 13, the bottom member 370 is configured to be secured the bottom portion 110 of the steering knuckle 104 and to the supporting member 340.

As for the top member 310, the bottom member 370 comprises a custom portion 372 particularly configured to be secured to the bottom portion 110 of the particular knuckle 104, and a generic portion 374 configured to be secured to the supporting member 340.

In the present embodiment, the bottom member 370 is substantially shaped as a plate and the custom portion 372 happens to generally correspond to the top surface of the bottom member 370 and the generic portion 374 happens to generally correspond to the bottom surface of the bottom member 370.

Understandably, the actual shape and configuration of the custom portion 372 of the bottom member 370 will vary in accordance with the actual shape and configuration of the bottom portion 110 of the knuckle 104. However, the configuration of the generic portion 374 will remain generally the same independently of the shape of the bottom portion 110 of the knuckle 104 in order to properly mate with the generic supporting member 340.

As illustrated in FIGS. 9 to 13, in the present embodiment, the custom portion 372 of the bottom member 370 comprises a main opening 376 for receiving the kingpin assembly 114 (i.e. the kingpin, the washer and the bearing), and a set of fastener holes 378 which matches the set of mounting holes 116 in the bottom portion 110 of the knuckle 104. The fastener holes 378 extend through the bottom member 370 and allow the fasteners (not shown) used to secure the kingpin assembly 114 to extend through the bottom member 370 and into the mounting holes 116.

As can be understood from the figures, in the present embodiment, the bottom member 370 is configured to be sandwiched between the kingpin assembly 114 and the bottom portion 110 of the steering knuckle 104. In that sense, the bottom member 370 further comprises a recess 380 (see FIGS. 12 and 13) suitably sized and shaped to receive the kingpin assembly 114 in a substantially flush manner. Still, in other embodiments, the bottom member 370 could be secured to the bottom portion 110 via other fastening arrangements.

For its part, the generic portion 374 of the bottom member 370 generally defines a mating area 382 configured to mate with the corresponding mating area 358 of the supporting member 340. In the present embodiment, mating areas 382 and 358 are substantially flat. In other embodiments, mating areas 382 and 358 could be other than flat. However, in such cases, mating areas 382 and 358 would typically be complementary In the present embodiment, the mating area 382 of the generic portion 374 comprises two set of mounting holes, a first set of mounting holes 384 and a second set of mounting holes 386.

The first set of mounting holes 384 matches the set of fastener holes 362 in the supporting member 340 and are configured to receive the fasteners 364 used to secure the supporting member 340 to the bottom member 370.

In the present embodiment, fasteners 364 are threaded and the mounting holes 384 are correspondingly threaded (e.g. bolts).

The second set of mounting holes 386 matches a least some of the fasteners holes 360 in the supporting member 340. These mounting holes 386 allow the fasteners used to secure the track system 200 to the supporting member 340 to also extend into the bottom member 370 for a stronger installation. As can be seen from the figures (see particularly FIG. 10), the bottom portion 346 of the supporting member 340 is larger than the bottom member 370. Hence, not all the fasteners used to secure the track system 200 to the supporting member 340 would extend into the bottom member 370.

Though not shown in the figures, one or more shim plates could be placed between the bottom member 370 and the supporting member 340 to provide for slight adjustments.

Referring back to FIGS. 3 to 13, the supporting member 340, already partially described above, will now be described in more details.

As already mentioned, the supporting member 340 provides predetermined attachment locations 360 in order to allow the track system 200 to be properly mounted to the steering knuckle 104. Due to its generic configuration, the supporting member 340 can be mounted to a wide variety of steering knuckles generally without modifications (only the customized adapting member(s) would differ). Furthermore, due to its arrays of attachment locations 360, the supporting member 340 can properly receive and support a variety of track systems.

As is shown in FIGS. 3 to 13, in the present embodiment, the supporting member 340 is configured to be mounted to both the top member 310 and the bottom member 370. Notably, once the supporting member 340 is mounted to the top and bottom members 310 and 370, most (e.g. more than 50%) of the periphery of the knuckle 104 is circumscribed by the adapter assembly 300 (see FIG. 5).

In order to properly link the top and bottom members 310 and 370, the supporting member 340 generally comprises a top portion 342, and central portion 344, and a bottom portion 346.

The top portion 342 is configured to mate with the top member 310. In that sense, as best shown in FIGS. 9 to 13, the top portion 342 comprises the mating area 348 substantially corresponding to the mating area 320 on the generic portion 314 of the top member 310.

In the present embodiment, the top portion 342 also comprises a series of fastener holes 350 extending therethrough such as to allow the mounting fasteners 352, already mentioned above, to be mounted through the top portion 342 and into the mounting holes 322 in the mating area 320. Understandably, the pattern of fastener holes 350 matches the pattern of mounting holes 322.

Still, in other embodiments, the top portion 342 could be mounted to the top member 310 with other forms of fastening arrangements.

The central portion 344 links the top portion 342 and the bottom portion 346 and generally allows the forces and loads transmitted by the track system 200 to be properly spread between the top portion 108 and the bottom portion 110 of the steering knuckle 104. In the present embodiment, the central portion 344 also comprises holes 345 (see FIG. 5) configured to receive the bracket (not shown) of the vehicle steering limiter (not shown).

In the present embodiment, the central portion 344 generally exhibits a convex curved shape in order to avoid interferences with the vehicle 100 and more particularly with the steering components (e.g. tie rods, cylinders, etc.). In the present embodiment, the central portion 344 also generally laterally flares as it extends from the top portion 342 toward the bottom portion 346 (see FIG. 6). This flaring allows the bottom portion 346 to be wider, thereby allowing lateral adjustment of the track system 200 with respect to the bottom portion 346 and thus with respect to the adapter assembly 300.

For its part, the bottom portion 346 is configured to mate with the bottom member 370 and is also configured to support the track system 200, and other track systems, via the attachment locations 360. In that sense, the bottom portion 346 generally comprises a top surface or region 354 and a bottom surface or region 356.

The top surface 354 is configured to mate with the generic portion 374 of the bottom member 370. In that sense, the top surface 354 generally comprises the already mentioned substantially flat mating area 358 which is generally shaped as the corresponding mating area 382 on the generic portion 374 of the bottom member 370.

The top surface 354, and more particularly the mating area 358, is provided with a set of fastener holes 362. The set of fasteners holes 362 extends through the bottom portion 346 all the way to the bottom surface 356 and are configured to allow the insertion of the fasteners 364 through the bottom portion 346 and into the mounting holes 384 of the bottom member 370.

In the present embodiment, the fasteners 364 are threaded fasteners (e.g. bolts) and the mounting holes 384 in the bottom member 370 are correspondingly threaded. Still, in other embodiments, the bottom portion 346 could be mounted to the bottom member 370 with other forms of fastening arrangements.

For its part, the bottom surface 356 of the bottom portion 346 is configured as a substantially flat receiving area configured to mate with the support frame assembly 208 of the track system. In that sense, the bottom surface 356 comprises the set of mounting holes 360 which corresponds to the attachment locations 360 where the track system 200 can be secured.

In the present embodiment, the mounting holes 360 comprises a front row generally located near the front edge of the bottom portion 346, and a rear row generally located near the rear edge of the bottom portion 346. The mounting holes 360 are also laterally spaced apart in order to provide some lateral adjustability when the track system 200 is secure to the supporting member 340.

Understandably, in other embodiments, the configuration, number and/or placement of the mounting holes 360 could be different.

In the present embodiment, at least some of the mounting holes 360 extend through the bottom portion 346 and in the mating area 358 in order to allow the mounting fasteners (not shown) used to secure the track system 200 to the supporting portion 340 to also extend into corresponding mounting holes 386 in the bottom member 370. Hence, in the present embodiment, the track system 200 would be directly secured to both the supporting member 340 and the bottom member 370. Still, in other embodiments, the track system 200 could possibly be directly secured only to the supporting member 340.

Notably, in the present embodiment, the first customized adapting member 310 and the second customized adapting member 370 are configured to be respectively mounted to the top and bottom portions of the steering knuckle 104. However, in other embodiments, depending on the configuration of the steering knuckle, the first customized adapting member 310 and the second customized adapting member 370 could be configured to be mounted to other portions (e.g. front, rear, etc.) of the steering knuckle.

Also, in other embodiments, depending on the size and configuration of the steering knuckle, there could be only one customized adapting member and one generic supporting member. In such embodiments, the sole customized adapting member would be configured to be mounted to steering knuckle. In that sense, the sole customized adapting member would generally comprises two custom portions typically configured to be mounted to the top and bottom portions (or to other portions) of the steering knuckle, and one generic portion configured to mate with the generic supporting member. For its part, the generic supporting member would comprise only one generic portion configured to mate with the generic portion of the customized adapting member, and one receiving portion comprising the attachment locations.

In use, the adapter assembly 300 is generally installed to the steering knuckle 104 prior to the installation of the track system 200.

Thus, once the wheel to be replaced by the track system 200 is removed, the operator will first secure the top and bottom members 310 and 370 to the knuckle 104.

Depending on the configuration of the knuckle 104, it might be necessary for the operator to remove the kingpin assembly 114 from the knuckle 104 and to reinstall it to the bottom member 370, or to remove the kingpin assembly 114 replace it by a slightly modified (e.g. longer) kingpin assembly.

Once the top and bottom members 310 and 370 are properly secured to the steering knuckle 104, the operator can secure the supporting member 340 to the top and bottom members 310 and 370.

If necessary, the position of the supporting member 340 can be slightly adjusted by placing one or more shim plates 324 between the top member 310 and the supporting member 340.

Then, once the adapter assembly 300 is properly mounted to the steering knuckle 104, the track system 200 can be secured to the supporting member 340 and more particularly to its attachment locations 360.

Understandably, by providing an interfacing adapter assembly between the track system 200 and the steering knuckle 104, the semi-generic steering knuckle adapter assembly 300 in accordance with the principles of the present invention provides proper attachment locations 360 where the track system 200 can be secured to the steering knuckle 104 while avoiding attachment at inconvenient and/or weak locations on the vehicle 100.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A steering assembly for supporting a track system on a vehicle, the vehicle having a front and a rear and being drivable on terrain, the steering assembly comprising:
   a) a steering knuckle having,
      a bottom side facing towards the terrain when the steering assembly is in use,
      a top side being opposite the bottom side,
      a front side facing towards the front of the vehicle when the steering assembly is in use, and
      a rear side being opposite the front side;
   b) a first member being secured to the top side of the steering knuckle;
   c) a second member being secured to the bottom side of the steering knuckle; and
   d) a support frame having,
      a top portion being secured to the first member,
      a bottom portion being secured to the second member and being configured to be secured to the track system to support the track system on the vehicle when the steering assembly is in use, and
      a central portion extending between the top portion and the bottom portion of the support frame and being positioned solely on one of the front side and the rear side of the steering knuckle.

2. The steering assembly of claim 1, wherein the bottom portion of the support frame is securable to the track system by having means for securing the bottom portion to the track system, the means being positioned in the bottom portion.

3. The steering assembly of claim 2, wherein the means for securing is means for securing the bottom portion of the support frame to at least two different track systems, the track system being one of the at least two different track systems.

4. The steering assembly of claim 1, wherein the second member is positioned between the bottom side of the steering knuckle and the bottom portion of the support frame.

5. The steering assembly of claim 1, wherein,
   the bottom portion of the support frame is positioned below the bottom side of the steering knuckle; and
   the second member is positioned between the bottom side of the steering knuckle and the bottom portion of the support frame.

6. The steering assembly of claim 1, wherein the central portion of the support frame laterally flares from the top portion to the bottom portion.

7. The steering assembly of claim 1, wherein,
   the bottom portion of the support frame has,
      a top surface facing the bottom side of the steering knuckle, and
      a bottom surface opposite the top surface;
   the second member has a mating surface that is in contact with the top surface of the bottom portion of the support frame;
   a first plurality of holes sized to receive a first plurality of threaded fasteners extends from the bottom surface into the second member; and
   at least a portion of each hole of the first plurality of holes that is in the second member is threaded to mateably receive therein a threaded fastener of the first plurality of threaded fasteners.

8. The steering assembly of claim 7, wherein,
   the bottom surface of the bottom portion of the support frame is larger than the mating surface of the second member;
   a second plurality of holes extends from the bottom surface toward the top surface of the bottom portion of the support frame; and
   the second plurality of holes is threaded to mateably receive therein a second plurality of threaded fasteners.

9. The steering assembly of claim 8, wherein at least one of the first plurality of holes and the second plurality of holes defines at least two different hole patterns for securement of the bottom portion of the support frame to at least two different track systems.

10. The steering assembly of claim 1, further comprising at least one of,
    a first shim positioned between the first member and the support frame; and
    a second shim positioned between the second member and the support frame.

11. The steering assembly of claim 1, wherein the first member is a block of metallic material that has a first surface that is secured to the top side of the steering knuckle, and a second surface that extends upward from the first surface and is secured to the top portion of the support frame.

12. The steering assembly of claim 1, wherein,
    the first member is secured to the top side of the steering knuckle with a first plurality of threaded fasteners;
    the second member is secured to the bottom side of the steering knuckle with a second plurality of threaded fasteners;
    the top portion of the support frame is secured to the first member with a third plurality of threaded fasteners; and
    the bottom portion of the support frame is secured to the second member with a fourth plurality of threaded fasteners.

* * * * *